April 16, 1957 F. J. HOFFMAN, JR 2,789,261
SERVOMECHANISM CONTROL SYSTEM
Filed May 5, 1953 4 Sheets-Sheet 1

INVENTOR
FRANK J. HOFFMAN, JR
BY
ATTORNEY

April 16, 1957  F. J. HOFFMAN, JR  2,789,261
SERVOMECHANISM CONTROL SYSTEM
Filed May 5, 1953  4 Sheets-Sheet 2

INVENTOR
FRANK J. HOFFMAN, Jr
BY
ATTORNEY

April 16, 1957 F. J. HOFFMAN, JR 2,789,261
SERVOMECHANISM CONTROL SYSTEM
Filed May 5, 1953 4 Sheets-Sheet 3

INVENTOR
FRANK J. HOFFMAN, JR.
BY
ATTORNEY

April 16, 1957  F. J. HOFFMAN, JR  2,789,261
SERVOMECHANISM CONTROL SYSTEM
Filed May 5, 1953  4 Sheets-Sheet 4

INVENTOR
FRANK J. HOFFMAN, JR.
BY
ATTORNEY

United States Patent Office 2,789,261
Patented Apr. 16, 1957

2,789,261

SERVOMECHANISM CONTROL SYSTEM

Frank J. Hoffman, Jr., Eden Roc, Lattingtown, N. Y., assignor to Sperry Rand Corporation, a corporation of Delaware Application May 5, 1953, Serial No. 353,048

18 Claims. (Cl. 318—39)

This invention relates generally to a system generating signals for controlling servomechanism drives. More particularly, in accordance with this invention a series of signals is generated suitable for simultaneously controlling one or more servomechanisms in positioning an object sequentially so that the object is cyclically and continuously driven through determinable spatial patterns.

In accordance with the invention, a signal producing means is employed with electronic circuitry to derive a repetitive cycle of control signals. One of the features of the invention is that the size, shape, and type of pattern through which the object is driven by means of controlling the servomechanism drives, may be changed by means of adjustment of the electrical values of components in the electronic circuitry.

Another feature of the invention is that it employs a minimum of mechanical devices and moving parts thereby eliminating many of the difficulties encountered due to friction, wear and other factors which contribute to malfunctions and misadjustment of such servomechanism control systems. Another feature of the invention is that its use of electronic circuits to derive the signals for controlling the servomechanism drives affords convenient adjustment of the amplitude and type of such signals at a central point and lends itself to remote control adjustment which cannot be realized with many of the electromechanical controls of the prior art.

In driving an object such as a radiant energy reflector through a cyclic sector or pattern, some prior art systems have derived control signals through a multiplicity of electromechanical switches positioned at or near the limits of one or more of the axes determined by the desired pattern. These switches were usually actuated by a cam arm or other device which, when the object was driven through a particular point or plane, would actuate a switch at the limit of the drive. This switch signal was in turn used to either stop or reverse the servomechanism drive so that the object might be driven in a new direction. Similarly, when the object reached the limit of the new direction of movement, another switch was actuated causing the servomechanism drive in the second direction of movement to be either stopped or reversed so that the object was driven in another new direction. This series of operations actuated a multiplicity of stops defining the limits of the pattern through which the object was to be driven until the cyclic pattern was complete and the object returned to its starting point where it began the cycle of operations over again.

In positioning a radiant energy reflector such as that employed in radar systems the limitations of such a servomechanism control system becomes more evident with the development of the art. In some systems the reflectors must be driven at a comparatively very high cyclic rate and the control system must also be adaptable to quick and precise adjustment. It can be seen that the use of mechanical stops or cams positioned at the limits of each of the axes of the pattern to be described and separately actuating switches each time a limit of an axis is reached becomes increasingly more involved in proportion to the complexity of the spatial pattern to be described by such an object. Additionally such stops must be physically moved and positioned in order that they actuate their associated switches at a time which will give a new adjustment of the spatial pattern. Such mechanical actuating means are also subject to the attendant difficulties encountered in devices of that nature employing moving parts. These include friction, maladjustment, binding, etc. in addition to the difficulty of physically reaching such mechanical devices for adjustment or correction of such malfunction.

The present invention in providing the control signals to drive servomechanisms in a spatial pattern having two major axes, contemplates the use of an electromechanical switch and electronic circuits responsive to the signal produced by that switch to automatically and cyclically position the driven object through a predetermined spatial pattern.

Such a pattern having two major axes may be, for instance, one of a substantially figure-eight type. In accordance with the present invention, the electrical values of a component in the electrical circuit may be adjusted to control the height of the figure-eight pattern. Adjustment of the electrical value of another component within the control circuit will change the shape of the figure-eight pattern. That is, a shape may be selected which tends to have a more squared or a more rounded configuration at its limits. Adjustment of the electrical value of still another component of the electrical control circuit changes the width of the pattern.

The object of the invention, therefore, is to generate by electronic means a determinable cycle of varied signals suitable for the simultaneous control of one or more related servomechanism drives.

Another object of the invention is to afford a system in which such signals may be adjusted with ease and facility.

Another object of the invention is to provide a system for generating varied servomechanism signals, utilizing electronic means to the exclusion of mechanical means as found in the prior art.

These and other objects of the invention will become apparent from the description of the operation of the invention.

An understanding of the invention will appear more fully from the following detailed description of its operation in a preferred embodiment when read in conjunction with drawings illustrating that embodiment in which, Fig. 1 is a planar projection of a typical figure-eight spatial pattern which may be described by the driven object through means of control signals derived from the present invention;

Figs. 2a, b, and c are examples of planar projections of the figure-eight spatial pattern achieved by adjustment of the electrical values of the control circuit of the invention;

Figs. 3a, b, c, d, e and f, are examples of the planar projection of the figure-eight spatial pattern in which the width of the pattern is changed by adjustment of the electrical values of the control circuit of the invention;

Figure 1:
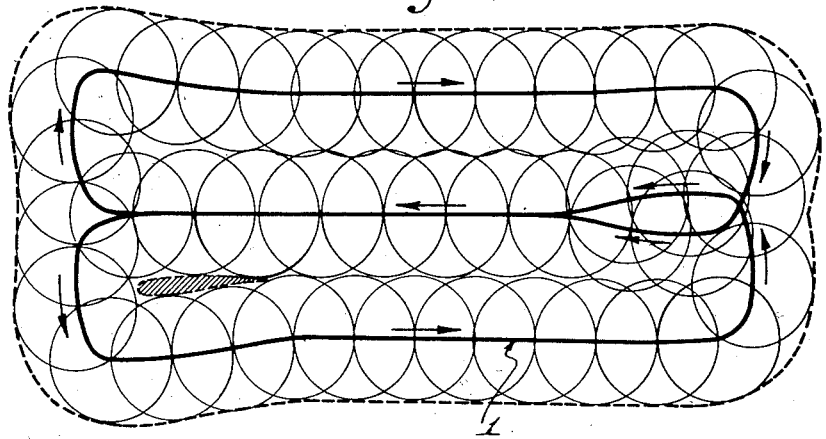
Figure 5:
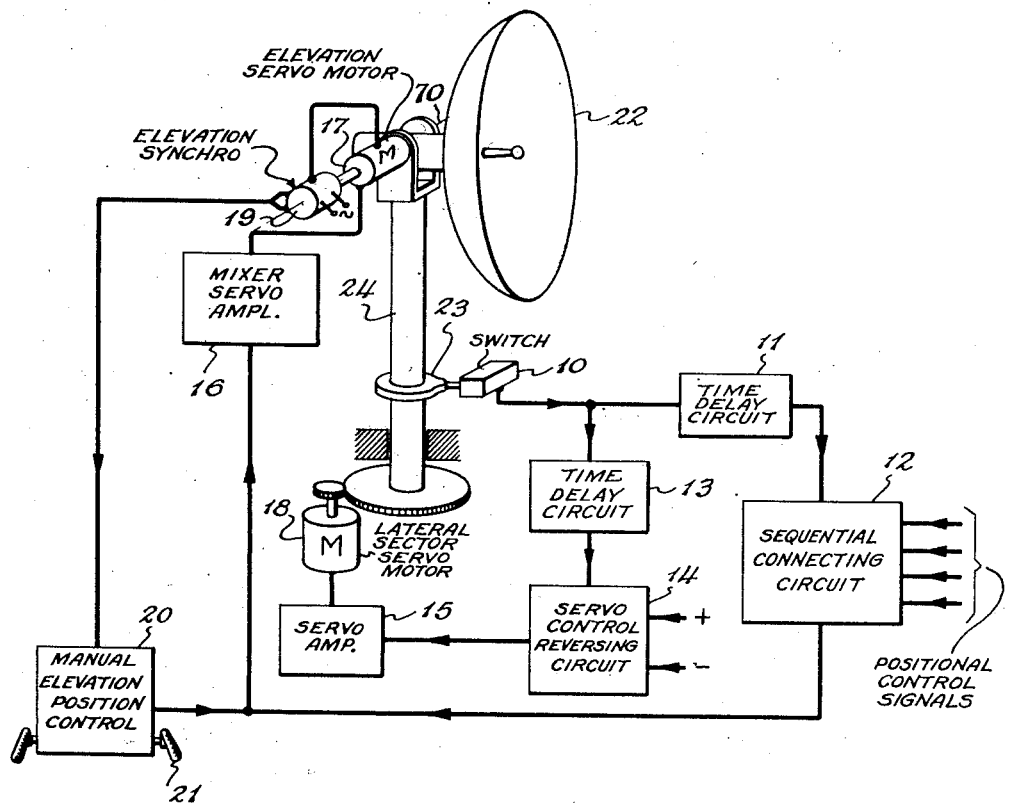
Fig. 5 is a schematic block diagram of the invention and its associated servomechanism drives and controls in a typical embodiment.

In a radar system, for instance, it may be desirable to position a radiant energy reflector such as a paraboloid 22 shown in Fig. 5 through a series of positions describing a pattern in space so as to search a given sector or volume of space. In some of its simpler forms, such search may merely comprise oscillation through a sector wherein the paraboloid is oscillated substantially about a single axis. In other search systems, however, it is desirable to drive the radar reflector through a series of positions describing a pattern having several axes. One such pattern is illustrated by Fig. 1. This pattern is substantially a figure-eight and the radar reflector is cyclically driven through a series of positions so that the pattern is continuously described in space by the radar reflector. In Fig. 1 the heavy lines of the compressed figure-eight as shown at 1, described the planar projection of the infinite series of points through which the axis of the radar beam is driven in its spatial pattern. The arrows associated therewith in Fig. 1 show an assumed direction of movement of the axis of the beam through the pattern. The series of circles drawn at various points along the pattern indicate the limits of a given power of the radar beam or nutation of the radar beam as it is being driven through the figure-eight spatial pattern.

Beginning at the lower left hand corner of the heavily lined figure-eight pattern, it will be seen that the radar reflector is initially driven to the right. When it reaches the extreme limit of the pattern to the right, it is driven up to a middle position and then to the left, whence it continues until it reaches approximately the left extreme corresponding in lateral displacement to the starting point. From here it is driven up again along the left hand edge of the pattern substantially the same distance as it was along the right hand edge of the pattern. The direction of movement is then changed to the right until the pattern reaches the right hand limitation whence the radar reflector is driven down to its middle position of elevation. Upon reaching the middle elevational position, the direction of movement is again changed to the left until the reflector reaches the left hand extreme edge of the pattern, whence it is driven down again and thus to return to its starting point.

Throughout the movement of the reflector through this pattern, the radar beam may be caused to nutate so as to quickly search a maximum volume of space in accordance with the design requisites and limitations of the overall radar system. It can be seen from Fig. 1 that a substantially rectangular pattern is described by upper, lower, right and left extreme limitations for the figure-eight pattern.

Fig. 5 shows a parabolic radar reflector 22 mounted so as to be driven by an elevation servomotor 17 and a lateral sector servomotor 18. These respective motors respond to appropriate signals to position the radar reflector in two degrees of spatial disposition. A single switch 10, which may be of a micro-switch type, is shown positioned so as to be actuated by a cam 23 fixed to the radar reflector mount 24. Switch 10 produces a signal each time it is actuated in response to movement of the cam 23 through a determinable plane notwithstanding that the movement may be in either lateral direction. Switch 10 is connected to time delay circuits 11 and 13 both of which receive the signals produced by the switch actuation.

The time delay circuit 13 is in turn connected to a servomechanism control reversing circuit 14. This servomechanism control reversing circuit is supplied with a source of positive and negative voltage as illustrated in Fig. 5. The time delay signal produced by time delay circuit 13 actuates servomechanism control reversing circuit 14 so as to effect a connection to a signal of opposite polarity upon each actuation. This signal of opposite polarity in turn is received by a servo amplifier 15 which drives a lateral sector servomotor 18. Since the servo amplifier 15 and the lateral sector servomotor 18 are polarity sensitive, a reversal of the lateral drive takes place in response to each switch actuation. But the reversal of lateral drive is delayed by an amount of time depending upon the time delay of the associated time delay circuit 13.

In a similar manner time delay circuit 11 receives the signal produced by switch 10 and delays the switch actuation signal by a determinable amount of time. A sequential connecting circuit 12 is supplied with a plurality of elevation positioning control signals. These elevation positional control signals are such that will, when impressed upon the elevation servomechanism system, position the driven object in elevational angular displacement proportional to the signal. The type of signal will depend largely upon the type of elevational servomechanism employed. These signals may all be of substantially the same kind, such as an A. C. signal, but merely varying in amplitude. The sequential connecting circuit 12 is actuated upon receiving the time delayed switch actuation signal, so as to connect the positional control signals to an elevation servo amplifier 16 in a predetermined cyclic sequence. Thus, servo amplifier 16 receives varying positional control signals and drives an elevation servomotor 17 in response to the series of positional control signals so as to position the parabolic radar reflector 22 in accordance, for instance, with the amplitude of the positional control signal.

Connected to the elevation axis generally indicated at 70 of the parabolic reflector mount 24 is an elevation synchro 19. A manual elevation positional control 20 is also shown as connected to receive the signals of the elevation synchro 19 and is also connected to the elevation servo amplifier 16. By positioning a set of handle bars 21 on the manual elevation positional control 20, a second synchro signal is produced and is compared with the signal produced by the elevation synchro 19. The difference between the two is fed to the elevation servo amplifier 16, which in turn drives the elevation servomotor 17 to position the radar reflector 22. In this manner, while the positional control signals are sequentially controlling the dispostion of the radar reflector in elevation, by use of the manual elevation signal control 20, the manual elevation signal may be superimposed upon the sequence of positional control signals supplied by sequential connecting circuit 12 to elevation servo amplifier 16, so that the elevation of the radar reflector may be changed as desired while continuing to describe its cyclic spatial pattern in elevation as well as its lateral sector.

From. Fig. 5 it can be seen that the amount of time delays imposed by the time delay circuits 11 and 13 controls the operation of the respective circuits which they feed so as to determine the size and shape of the pattern described by the radar reflector 22. Similarly, by altering the amplitude of the positional control signals fed to the sequential connecting circuit 12, the height of the pattern may be adjusted. In the elevation axis the synchro system consisting of the synchro mounted on the scanner and the synchro mounted in the handle bar device cause the elevation system to function as a position servo with the scanner following exactly the position in the handle bar manual elevation positioning device. Actually the sequential elevation signals merely cause a displacement or bias to be inserted in addition to the position signals of the two aforementioned synchros. The lateral axis is truly a free running servo with the reversing signal merely changing the direction of rotation.

Figure 2A:
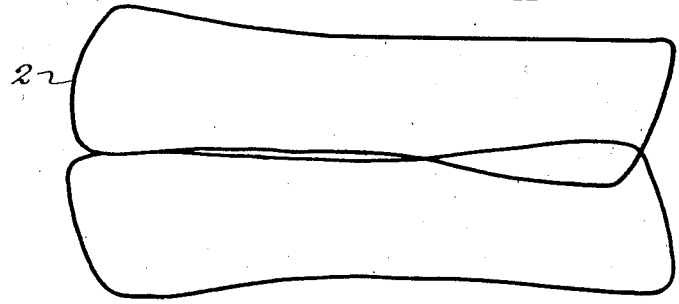
Figure 2B:
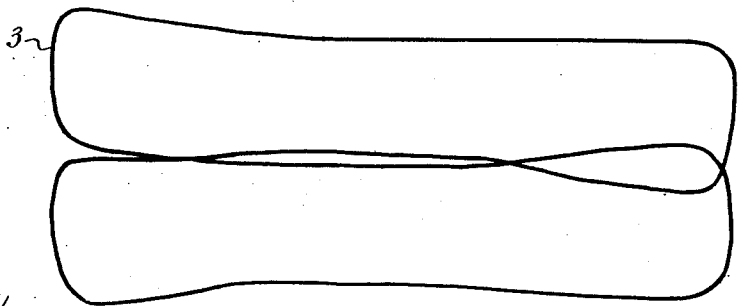
Figure 2C:
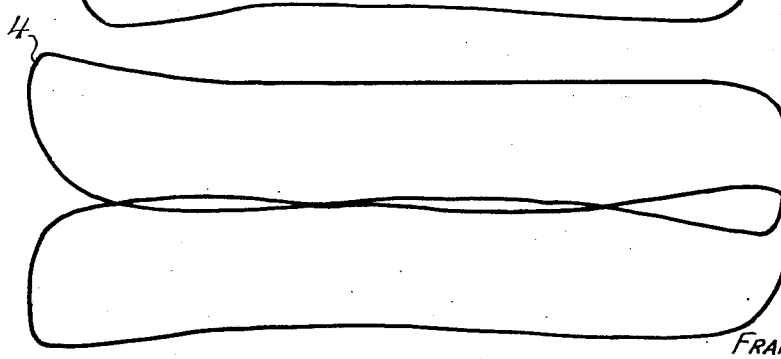
Figure 3A:
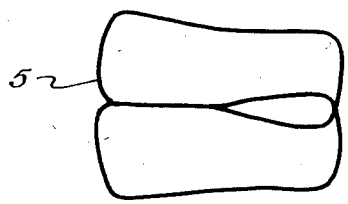
Figure 3B:
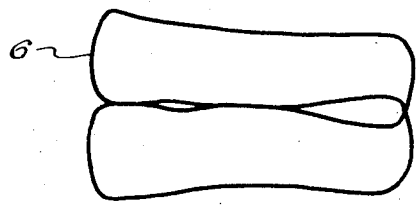
Figure 3C:
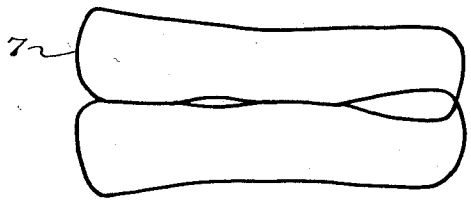
Figure 3D:
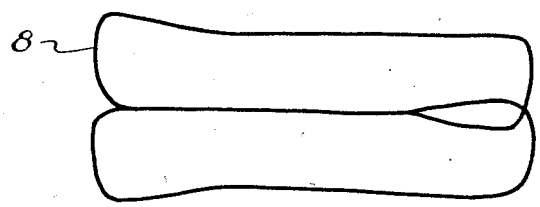
Figure 3E:
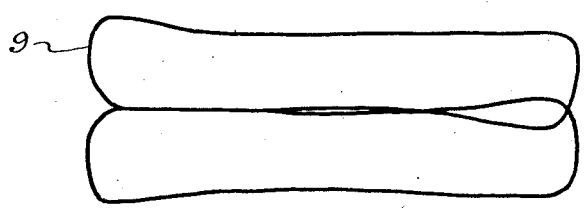
Figure 3F:
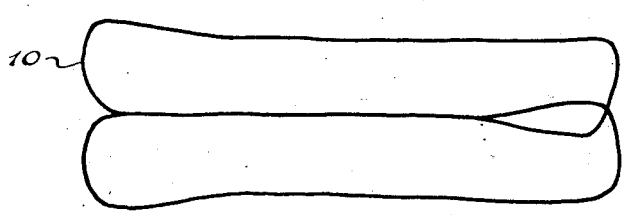
Figure 4:
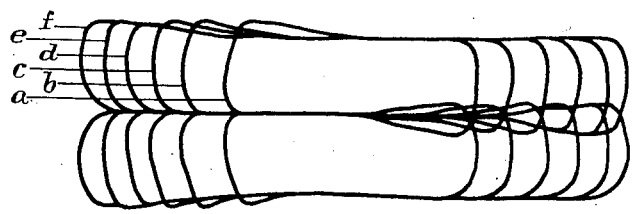
Fig. 4 is an example of the planar projections of the figure-eight spatial patterns of Fig. 3 superimposed for comparison.

By increasing or decreasing the amount of time delay interposed by the time delay circuit 11, the shape of the pattern can be changed, particularly at its extremes where it changes direction abruptly. While it may appear that a change in time delay circuit 11 would effect changes in both size and shape of the pattern, the choice of electrical components of appropriate value will result in having the shape of the pattern substantially dependent upon the time constant of time delay network 11, as was found to be the case in a preferred embodiment of the invention. Such adjustment will tend to round off the ends of the pattern or square up the ends of the pattern as the case may be, depending upon whether there is an increase or a diminution of the time delay. This type of change is illustrated in Figs. 2a, b and c. A comparison of these figures will show how the ends of the pattern particularly, are changed by adjustment of the time delay imposed on the elevation servomechanism system by means of the time delay circuit 11. The right and left extremes of pattern 2a, for instance, show a pattern which is distinctly skewed. The right and left extremes of Fig. 2b, for instance, are considerably squared up through adjustment of the time delay of circuit 11, as explained hereinbefore. Similarly, Fig. 2c illustrates still another change in shape characterized by rounding off the right and left extremes of the pattern through a change in the time delay imposed upon the elevation servomechanism drive control signals.

The above described adjustment of the shape of the pattern will be better understood by considering the analogous circuitry which supplies the control signals for the lateral sector servomechanism drive. As previously stated, the lateral sector servomechanism drive is basically a free running system. However, the servomechanism control reversing circuit supplies alternate signals of negative and positive polarity to the servomechanism amplifier 15. This reversing of polarity is had in response to the time delayed signal received by the servomechanism control reversing circuit 14 from the lateral sector time delay circuit 13. Therefore, each time the cam 23 is driven through a fixed point, the switch 10 is actuated and produces a signal so that the lateral sector servomechanism motor 18 reverses its direction of drive in response to each such switch actuation. However, the reversal signal from the servomechanism control reversing circuit 14 is delayed by an amount of time depending upon the time constant of the time delay circuit 13 and consequently the lateral sector motor 18 will continue to drive in the same direction during the time delay. Upon reversal of the lateral sector servomotor drive, the cam 23 will have been driven through and beyond the point at which it actuates the switch 10, with the result that each signal reversal in the lateral servomechanism system drives the radar reflector mount in such a direction that the cam 23 is always driven back toward the switch 10. Upon reaching the same predetermined or fixed point, the cam 23 actuates the switch 10 again and a signal is produced which is received by the time delay circuit 13, actuating the servomechanism control reversing circuit 14, reversing the polarity of the signal to the servomechanism amplifier 15, and similarly reversing the direction of drive of the lateral sector servomotor 18. It is apparent that due to the time delay of the reversal of polarity of the control signal, the lateral sector servomotor 18 continues to drive the radar reflector mount 24 in the some direction until the cam 23 has again driven through and beyond the point at which it actuates the switch 10.

By this arrangement, it can be seen that the radar reflector mount is driven through a lateral sector determined by the amount of time delay interposed by time delay circuit 13. It is also apparent that in the described embodiment, a cam 23 or other switch actuation device will be positioned at the center of the lateral sector through which the mount is driven. In other words, the radar reflector mount 24 and the radiant energy reflector 22 will be driven clockwise through a distance from the point of switch actuation determined by the amount of time delay afforded by the time delay circuit 13. Likewise, the radiant enregy reflector 22 and its mount 24 will be driven counterclockwise for the same time after the switch actuation as it was driven clockwise. The amount of time delay interposed in each case being the same, both being derived from time delay circuit 13. It follows therefore that if the speed of drive afforded by the lateral sector servomotor 18 is the same in either direction, the lateral sector of displacement described by the amount 24 through the use of the lateral control system will be the same about a central axis coincident with the axis of the cam 23.

Considering the operation of the two time delay circuits in conjunction with each other, it may be seen that a pattern such as that illustrated by Fig. 1 can be achieved by the use of the present system. Assuming, for purposes of illustration, that the radiant energy reflector 22 has its radar beam axis positioned at the lower left hand corner of the pattern of Fig. 1, it follows that in a free running servomechanism system, as it is driven to the right and passes through a fixed point at the center of the pattern, there is an actuation of the switch 10, producing a signal. However, the lateral sector servomotor continues to drive the mount and its radar reflector for a time determined by the interposed time delay supplied by the time delay circuit 13. Simultaneously, the switch actuation signal is supplied to the time delay circuit 11 and after a similar time delay, it actuates the sequential connecting circuit 12 which feeds a new positional control signal to the elevation servomechanism drive. This latter signal drives the radar reflector up in elevation as shown on the lower right portion of Fig. 1. By the time the driven object reaches its new position in elevation, the reversing circuit 14 has supplied an opposite polarity of signal to the lateral servomechanism drive directing the driven object now toward the left, from the right hand lateral extreme in the pattern of Fig. 1, so that the cam 23 is again approaching the switch 10. When the cam 23 reaches the same predetermined fixed point with respect to the switch 10, it actuates the switch 10 producing a signal which is again fed to time delay circuits 11 and 13 and concurrently effects control signals in the elevation and lateral servomechanism drive systems so as to drive the radar reflector up as shown in the upper left hand corner of Fig. 1 to a new position in elevation, and reversing the servomechanism control signal fed to the lateral sector servomechanism drive so that the mount 24 and its radiant energy reflector 22 is again reversed in direction of lateral movement and the cam 23 is again approaching the switch 10. These steps are repeated so as to drive the radiant energy reflector 22 through its complete cycle of positions described in the figure-eight pattern illustrated in Fig. 1.

Figure 6:
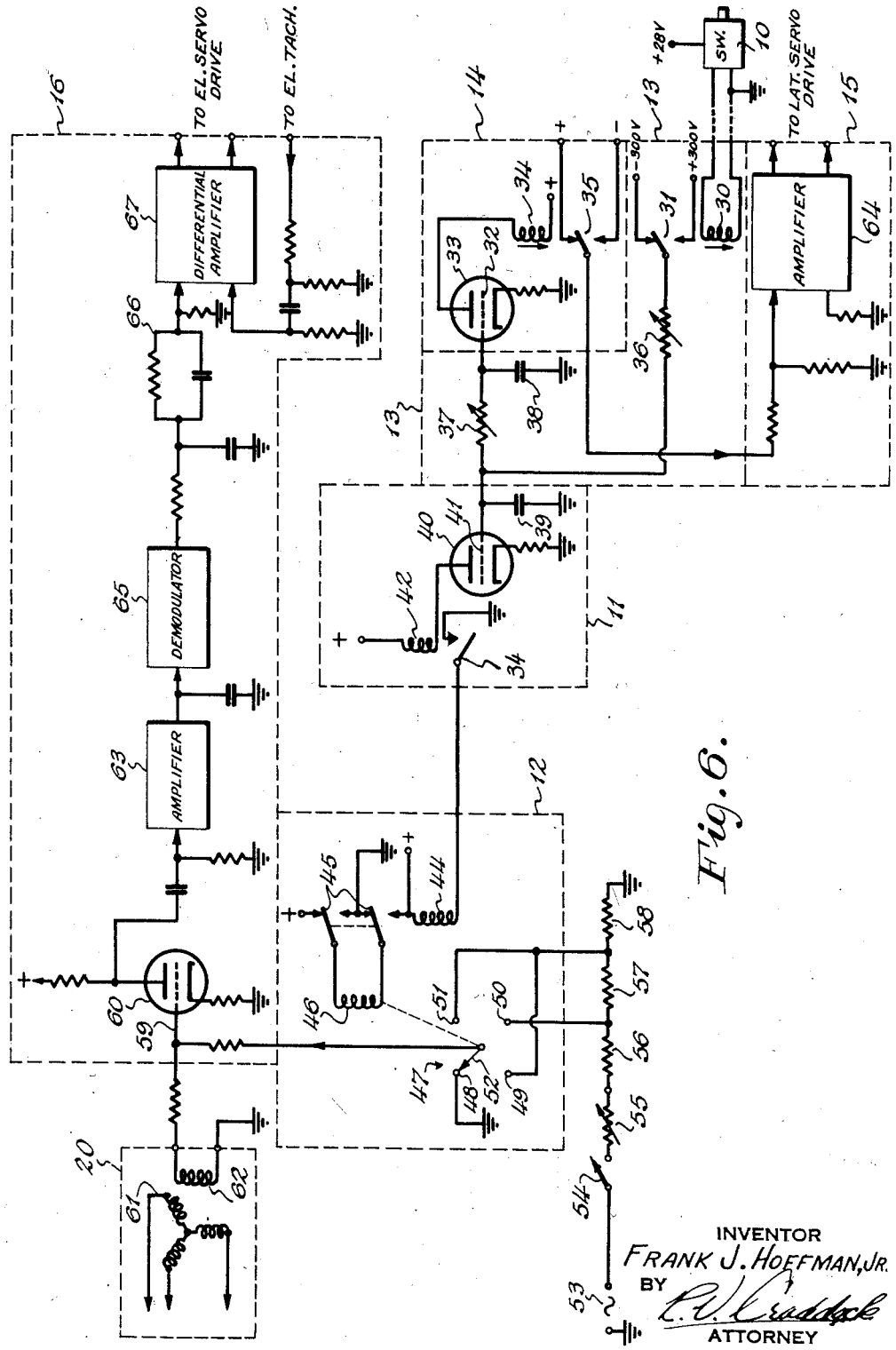
Fig. 6 is a detailed schematic diagram of the control circuitry in a typical embodiment of the invention.

Fig. 6 is a detailed schematic diagram of a preferred embodiment of the present invention. Bearing in mind that this combination of components is designed to produce appropriate control signals to drive a two axes servomechanism system so as to position an object sequentially through a figure-eight pattern, the step by step operation of the invention will be explained.

Portions of Fig. 6 enclosed within dotted lines correspond to components of the invention as illustrated in block diagram form in Fig. 5 and bear corresponding numerical identification. The signal produced by actuation of the switch 10 of Fig. 5 is received by a relay 30 of Fig. 6, which is shown as being connected to a source of D. C. potential. Upon actuation of the lateral search microswitch 10, current flows through relay coil 30 actuating a relay switch 31. The switch 31 may be assumed to initially be in the position shown in Fig. 6, i. e., connected to a negative 300 volt D. C. potential. Since the switch 31 is also connected to the grid 32 of a control tube 33, the negative potential will render the control tube 33 non-conductive. However, upon the actuation of the switch 31 to its lower position in response to current flow in the relay 30 the switch 31 is connected to a positive 300 volt D. C. potential and a positive charge is built up on a capacitor 38 by current flow through two variable resistors 36 and 37. When sufficient positive charge is accumulated by the capacitor 38, the grid 32 of the control tube 33 acquires a potential above the cut-off point and the control tube 33 becomes conductive permitting a flow of current through a relay coil 34 in its plate circuit. Upon control tube 33 becoming conductive, the flow of current through the relay coil 34 actuates a relay switch 35 which changes the polarity of the signal connected and fed to an amplifier 64. Thus, the output of the amplifier 64, which ultimately controls the lateral sector servomotor, is reversed.

The same switch 31 which is connected to the control tube 33 is also connected to the grid 41 of a second control tube 40, and it also maintains the control tube 40 beyond cut-off by impressing the negative D. C. potential upon its grid 41 as was previously assumed for the initial conditions. When the switch 31 is connected to the positive 300 volt D. C. potential, second condenser 39 associated with the second control tube, builds up a positive charge to a point where it too exceeds the cut-off potential and allows the control tube 40 to conduct. Conduction through the control tube 40 causes current flow through a relay coil 42 in its plate circuit. This in turn actuates a switch 43 connecting it to ground. A relay coil 44 has one terminal connected to a source of potential and its other terminal connected to the switch 43 so that when the relay switch 43 is actuated and connected to ground, current is caused to flow through the relay coil 44. The relay current flow through the coil 44 actuates a ganged switch 45 and a relay coil 46 is alternately energized with potentials of opposite polarity. This causes current to flow in opposite directions upon the actuation and deactuation of the ganged switch 45. The relay coil 46 controls the operation of a stepping switch 47, which actuation sequentially connects a contact arm 52 to a plurality of contact points 48, 49, 50 and 51 of the stepping switch 47.

As will be noted, the contact point 48 is connected to ground while the contact points 49, 50 and 51 are connected to sources of potential of varying amplitude. A source of alternating voltage 53 is connected through a switch 54 and a variable resistor 55 to several fixed resistors 56, 57 and 58 and thence to ground. Thus, the contact points 49 and 51 are connected to a lower potential than the contact point 50, because of the voltage drop produced by the resistor 57.

When the step relay 46 is actuated by successive signals, the stepping switch 47 is sequentially connected to each of the contact points 49, 50 and 51. Varying amplitudes of potential are thus fed to the grid 59 to an electron tube 60.

It should also be noted that by disconnecting the switch 54, the source of potential is removed from the contact points 49, 50 and 51 so that no voltage is fed to the grid 59 of the electron tube 60 from this source. On the other hand, by allowing switch 54 to remain connected and adjusting the variable resistor 55, the potentials fed to the grid 59 of the electron tube 60 through the contact points 49, 50 and 51, may be proportionately increased or decreased.

In accordance with the actuation of the stepping switch 47 as described above, a predetermined potential will be applied to the grid 59 of electron tube 60 depending upon the position of contact arm 52. Also applied to the grid 59 of electron tube 60 is a signal from a data transmission system comprising the elevation synchro 19 and the manual elevation position control 20. The three stator leads of the manual elevation position control stator 61 are connected to the corresponding terminals of the stator of elevation synchro 19. The synchro rotor 62 of manual elevation position control 20 has a signal induced therein from the data transmission system and applies this signal to the grid 59 of tube 60. The signal from the data transmission system and the signal from the stepping switch 47 are combined to form the input to grid 59 of tube 60. The output of tube 60 is applied to amplifier 63 where the resultant signal is amplified and may be fed to demodulator 65. The output of demodulator 65 feeds the rate capacitor and displacement resistor of circuit 66, the output thereof being one input to differential amplifier 67. The output from differential amplifier 67 controls the operation of elevation servomotor 17. A velocity signal from an elevation tachometer, which is indicated in Fig. 6 but is not indicated in Fig. 5 for purposes of clarity, supplies a feedback signal for damping purposes to the differential amplifier 67. In one embodiment of the invention such as that indicated in Fig. 6 the signal source indicated at 53 and the signal source to the data transmission system could be 400 cycle signals. However, it is to be understood that the invention may be applied to A.-C. or D.-C. systems and would require only the substitution of conventional components in a well known manner.

In elevation, the position of the object being controlled is substantially dependent on the amplitude of the composite signal fed to the grid 59 of the electron tube 60. As may be seen, a portion of this signal can be derived from the elevation synchro 61 and another portion of the signal may be derived from the potential at the contact points 48, 49, 50 and 51. Since the contact point 48 is merely a ground connection it supplies no signal in addition to the elevation signal received by the electron tube 60. When the contact arm 52 of the stepping switch 47 is connected to the contact point 49, a predetermined amplitude of signal is supplied to the grid 59 of the electron tube 60 which will ultimately position the driven object in an intermediate or midpoint elevational displacement such as the intermediate or midpoint elevational position shown by the figure-eight pattern of Fig. 1. When the contact arm 52 is connected to the contact point 50 by operation of the stepping switch 47, a signal of greater amplitude is connected to the grid 59 of the electron tube 60, with the result that the driven object is positioned to its upper displacement as shown in the figure-eight pattern of Fig. 1. It is, of course, to be borne in mind that the operation of the stepping switch 47 is had in response to each signal from the lateral search micro switch 10 and that each sequential operation bears a predetermined relationship to the lateral sector control circuits and the micro switch operation.

Referring to the RC network which is formed by the resistors 36, 37 and the capacitors 38 and 39, it will be seen that the time constant of this network determines the lapse of time between the actuation of the relay coil 30 and the switch 31 and consequently current conduction through the tube 33. Similarly, the RC network formed by the resistor 36 and the capacitor 39 has a time constant which controls the time at which there is current conduction through the control tube 40 in response to actuation of the switch 31. By adjustment of the variable resistor 36, the time constants of the RC networks associated with the tubes 40 and 33 may be changed so that the point of time at which the sequential connecting circuit 12 and the lateral reversing circuits, will be actuated, may be concurrently controlled so that the shape is not effected by adjustment of the width. The shape of the ends of a figure-eight pattern, for instance, as previously noted in connection with the description of Figs. 2a, b and c, may be changed as desired by adjustment of the variable resistor 37. Though this adjustment may change the length of the pattern somewhat, it primarily effects the end shape of the pattern in the embodiment shown, by changing the ratio of time delays between the elevation and lateral control circuit.

Similarly, the resistor 37 effects the time constant of the RC network comprised of the resistors 36 and 37, and the capacitor 38, so that the point of time at which the control tube 33 begins current conduction after tube 40 has conducted, may be controlled by adjustment of the variable resistor 37.

Since variable resistor 36 substantially controls the point of time at which both control tubes 33 and 40 conduct after the actuation of switch 10 and relay 30, it is the principal element of control of the width of the pattern.

Variable resistor 37 substantially controls the time delay of the signal fed to the grid 32 of control tube 33 without significant effect upon the operation of control tube 40. Adjustment of variable resistor 37 will therefore effect control of the time-delayed interval between successive operation of control tubes 33 and 40, to control the shape of the pattern.

One very desirable feature of the present invention is that unlike many systems in the prior art, it employs only one electromechanical switch and by interposing time delays on the signal produced by that switch actuation, provides a means of controlling the shape, width and height of a multiaxis cyclic pattern through which the driven object is to be positioned by the several servomechanism drives. Another worth-while feature is that when a desired shape of pattern has been attained, the width of the pattern may be adjusted or varied without further effecting the shape of the pattern.

The control circuits as shown in Fig. 6, may be removed from the immediate structure of the driven object and positioned at a point where convenient remote control is afforded. Moreover, by the simple and expeditious means of adjusting a variable resistor or actuating a switch, the type or proportionality of the basic pattern for which the system is to supply control signals, may be changed.

It is apparent that additional switches might be interposed in the control circuits to afford a partial or entire bypass of a particular element or elements in the respective associated RC networks and thereby change the nature of the control signal cycle and ultimately the cyclic pattern through which it causes the driven object to be positioned.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

I claim:

1. In a system for driving an object through a cyclic spatial pattern, reversible means for driving said object in at least first and second degrees of freedom, signal-producing switch means, means positioned and adapted to actuate said switch means each time said object is driven through a determinable sector of one of said degrees of freedom, time-delay means for each of said degrees of freedom connected to receive said switch-actuation signals, a plurality of control signals associated with each of said driving means and connectably disposed to separately energize each of said driving means, and means responsive to said time-delayed switch-actuation signals to connect each of said plurality of control signals to its respective driving means in determinable sequence, whereby said object is continuously driven through positions describing a spatial pattern determined by the ratio of the respective time delays introduced and the respective sequences of said pluralities of control signals.

2. In a system for driving an object through a cyclic spatial pattern, reversible means for driving said object about first and second axes of movement defined by said pattern, signal-producing switch means, means positioned and adapted to actuate said switch means each time said object is driven through a fixed point in the sector of movement about said first axis, first time-delay means connected to receive said switch-actuation signals, means responsive to each said first time-delayed signal to reverse said first driving means, second time-delay means connected to receive said switch-actuation signals, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the respective time delays introduced and the sequence of signals controlling the position of said object about said second axis.

3. In a system for driving an object through a cyclic spatial pattern, reversible means for driving said object about first and second axes of movement defined by said pattern, signal-producing switch means, means positioned and adapted to actuate said switch means each time said object is driven through a fixed point in the sector of movement about said first axis, first time-delay means connected to receive said switch-actuation signals, means for varying the time constant of said first time-delay means, means responsive to each said first time-delayed signal to reverse said first driving means, second time-delay means connected to receive said switch-actuation signals, means for varying the time constant of said second time-delay means, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the respective time delays introduced and the sequence of signals controlling the position of said object about said second axis.

4. In a system for driving an object through a cyclic spatial pattern, reversible means for driving said object about first and second axes of movement defined by said pattern, signal-producing switch means, means positioned and adapted to actuate said switch means each time said object is driven through the center of the sector of movement about said first axis, first time-delay means connected to receive said switch actuation signals, means responsive to each said first time-delayed signal to reverse said first driving means, second time-delay means connected to receive said switch-actuation signals, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the respective time delays introduced and the sequence of signals controlling the position of said object about said second axis.

5. In a system for driving an object through a cyclic spatial pattern, reversible means for driving said object about first and second axes of movement defined by said pattern, signal-producing switch means, means positioned and adapted to actuate said switch means each time said object is driven through the center of the sector of movement about said first axis, first electrical time-delay means comprising an impedance-reactance network connected to receive said switch-actuation signals, means responsive to each of said first time-delayed signal to reverse said first driving means, second electrical time-delay means comprising an impedance-reactance network connected to receive said switch-actuation signals, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the time delays introduced by the respective impedance-reactance networks and the sequence of signals controlling the position of said object about said second axis.

6. In a system for driving an object through a cyclic spatial pattern, reversible means for driving said object about first and second axes of movement defined by said pattern, signal-producing switch means, means positioned and adapted to actuate said switch means each time said object is driven through the center of the sector of movement about said first axis, first electrical time-delay means comprising a resistance-capacitance network connected to receive said switch actuation signals, means responsive to each said first time-delayed signal to reverse said first driving means, second electrical time-delay means comprising a resistance-capacitance network connected to receive said switch actuation signals, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the time delays introduced by the respective resistance-capacitance networks and the sequence of signals controlling the position of said object about said second axis.

7. In a system for driving an object through a cyclic spatial pattern, reversible means for driving said object about first and second axes of movement defined by said pattern, signal-producing switch means, means positioned and adapted to actuate said switch means each time said object is driven through the center of the sector of movement about said first axis, first electrical time delay means comprising a selectively variable resistive-capacitive network connected to receive said switch actuation signals, means responsive to each said first time-delayed signal to reverse said first driving means, second electrical time delay means comprising a selectively variable resistive-capacitive network connected to receive said switch actuation signals, a plurality of control signals connectably disposed to energize said second driving means and position said object about said second axis, and means responsive to said second time-delayed signals to sequentially connect each of said plurality of positioning control signals to said second driving means, whereby said object is continuously driven to describe a spatial pattern determined by the ratio of the time delays introduced by the selected values of the respective resistive-capacitive networks and the sequence of signals controlling the position of said object about said second axis.

8. In a system for driving an object through a cyclic spatial pattern, reversible means for driving said object about first and second axes of movement defined by said pattern, signal-producing switch means, means positioned and adapted to actuate said switch means each time said object is driven through the center of the sector of movement about said first axis, first time-delay means connected to receive said switch actuation signals, means responsive to each said first time-delayed signal to reverse said first driving means, second time delay means connected to receive said switch actuation signals, a variable signal source, a plurality of control signal taps on said source connectably disposed to energize said second driving means and position said object about said second axis, and means responsive to said second time-delayed signals to sequentially connect each of said plurality of tapped positioning control signals to said second driving means, whereby said object is continuously driven to describe a spatial pattern determined by the ratio of the respective time delays introduced, the amplitude of said variable signal source and the sequence of signals tapped from said source.

9. In a system for oscillating an object about an axis, reversible driving means, signal-producing switch means, means positioned and adapted to actuate said switch means each time said object is driven through a selectable point, time-delay means connected to receive said switch actuation signals, and means responsive to each said time-delayed signal to reverse said driving means, whereby said object is continuously oscillated about an axis to describe a sector determined by the amount of time delay introduced.

10. In a system for oscillating an object about an axis, reversible driving means, signal-producing switch means, means positioned and adapted to actuate said switch means each time said object is driven through a selectable point, time-delay means connected to receive said switch actuation signals, means for varying the time delay of said time delay means, and means responsive to each said time-delayed signal to reverse said driving means, whereby said object is continuously oscillated about an axis to describe a sector determined by the amount of time delay introduced.

11. In a system for driving an object through a cyclic spatial pattern having a planar projection substantially of a figure-eight, first and second reversible driving means for driving said object about the first and second axes of said pattern respectively, signal-producing switch means, means positioned and adapted to actuate said switch means each time said object is driven through a fixed point in its sector of movement about said first axis, first and second time-delay means connected to receive said switch-actuation signals, means responsive to each of the signals derived from said first time-delay means for reversing said first driving means whereby to oscillate said object, a plurality of control signals for respectively causing said second driving means to position said object about said second axis in relatively different angular positions, one signal pointing said object in a relatively low position, another at an intermediate position, and the other at a relatively high position, and means for connecting said control signals successively to control said second driving means in a predetermined cyclic manner such as to cause said object to substantially generate a figure-eight.

12. In an object detection system employing a beam of directional radiant energy to search a volume of space in a cyclic pattern having a planar projection substantially of a figure-eight, means for directing said beam of radiant energy, first and second reversible driving means for driving said beam-directing means about the first and second axes of said pattern respectively, signal-producing switch means, means positioned and adapted to actuate said switch means each time said beam-directing means is driven through a fixed point in its sector of movement about said first axis, first and second time-delay means connected to receive said switch-actuation signals, means responsive to each of the signals derived from said first time-delay means for reversing said first driving means whereby to oscillate said beam-directing means, a plurality of control signals for respectively causing said second driving means to position said object about said second axis in relatively different angular positions, one signal pointing said beam-directing means in a relatively low position, another at an intermediate position, and the other at a relatively high position, and means for connecting said control signals successively to control said second driving means in a predetermined cyclic manner such as to cause said beam-directing means to substantially generate a figure-eight.

13. A system for driving an object in an oscillatory manner, said system comprising a reversible servomotor adapted to drive said object, control means for controlling said servomotor, switch means operable upon successive operations to alternate one of two positions for supplying a control signal in at least one position thereof effective to cause the servomotor to drive in one direction for that switch position and to drive in the opposite direction for the other switch position, means driven in timed relation with said object for actuating said switch means each time said object passes a preselected point, a signal transmission circuit connected to receive said control signal at the input thereof and its output being connected to said servomotor control means, and means in said signal transmission circuit for transmitting all signals supplied thereto but with a time delay whereby each actuation of said switch means will effect a reversal of said servomotor after an intervening time interval.

14. In a system for imparting to an object motion alternately in two opposite directions, reversible driving means drivably coupled to said object, signal producing switch means and a cam one of which is connected to said object whereby movement of said object produces relative movement between said cam and said switch whereby said cam actuates said switch to produce a signal each time said object is driven through a selectable point, time delay means coupled to receive said switch actuation signal and produce a time delayed signal, means responsive to said delayed signal to alternately reverse said drive means whereby said object is continuously driven in two opposite directions, the distance covered in each direction being determined by the amount of time delay introduced.

15. In a system for oscillating an object about an axis, reversible driving means, signal producing switch means, mechanical means positioned and adapted to actuate said switch means each time said object is driven through a selectable point, time-delay means connected to receive said switch actuation signal, and means responsive to each said time-delayed signal to reverse said driving means, whereby said object is continuously oscillated about an axis to describe a sector determined by the amount of time-delay introduced.

16. In a system for oscillating an object about an axis, reversible driving means, signal-producing switch means, means including a cam positionably coupled to said object and adapted to actuate said switch means each time said object is driven through a selectable point, time-delay means including an R-C circuit connected to receive said switch actuation signals, and means responsive to each said time-delayed signal to reverse said driving means whereby said object is continuously oscillated about an axis to describe a sector determined by the amount of time-delay introduced.

17. A control system for driving an object about an axis comprising an object adapted to oscillate about an axis, a reversible servomechanism adapted for oscillating said object, signal producing means including a relay switch, means positionably coupled to said object and adapted to actuate said switch each time said object is driven through a selectable point, variable time-delay means including an R-C circuit adapted to receive said signal, and means responsive to said time-delayed signal to reverse said servomechanism.

18. A scanning system for causing an antenna to scan cyclically through a selectable arc comprising a reversible servomechanism for driving said antenna, signal producing means including a switch and relay combination, means including a cam coupled to the antenna and adapted to actuate the switch each time the antenna is driven through a selectable point, variable time-delay means including an R-C circuit adapted to receive said signal, means for varying the sector through which the antenna is caused to oscillate by varying the time constant of the R-C circuit, and means responsive to said time-delayed signal to reverse said servomechanism.

References Cited in the file of this patent

UNITED STATES PATENTS

| | | |
|---|---|---|
| 2,570,251 | Lester | Oct. 9, 1951 |
| 2,605,453 | Miller | July 29, 1952 |
| 2,647,258 | McCoy | July 28, 1953 |
| 2,648,038 | Morse | Aug. 4, 1953 |
| 2,660,722 | Ley | Nov. 24, 1953 |
| 2,680,223 | Hammett | June 1, 1954 |